United States Patent

Porter et al.

[15] 3,686,958
[45] Aug. 29, 1972

[54] FIBER OPTIC PRESSURE DETECTOR

[72] Inventors: John H. Porter, Cochester Point; David B. Murray, Fairfax, both of Vt.

[73] Assignee: Ladd Research Industries, Inc., Burlington, Vt.

[22] Filed: Feb. 22, 1971

[21] Appl. No.: 117,448

[52] U.S. Cl. ............... 73/406, 73/398 R, 128/2.05 D, 350/96 B
[51] Int. Cl. .......... A61b 5/00, G011 7/08, G02b 5/14
[58] Field of Search ............. 73/398 R, 46; 350/96 B; 128/2.09 R, 2.05 DE, 2.05 N

[56] References Cited

UNITED STATES PATENTS

| | | | |
|---|---|---|---|
| 3,215,135 | 11/1965 | Franke | 350/96 B X |
| 3,273,447 | 9/1966 | Frank | 73/406 X |
| 3,580,082 | 5/1971 | Strack | 73/406 |

OTHER PUBLICATIONS

Eversden, I. D. Modifications to a Miniature Pressure Transducer for the Measurement of Intracranial Pressure. In Medical and Biological Engineering, Vol. 8, pp. 159–164, Pergamon Press, 1970.

*Primary Examiner*—Louis R. Prince
*Assistant Examiner*—Frederick Shoon
*Attorney*—William R. Hulbert

[57] ABSTRACT

A sensor unit precisely monitors ambient pressure within a confined space, such as intracranial pressure of a human patient, utilizing fiber optic light guides. A pair of light guides pass within a pneumatic line into a flexible envelope which is implanted in the skull. Of the external ends of the guides, one faces a light source and the other a photocell. Within the envelope the guide ends are so arranged with respect to light beam modulating mechanism responsive to envelope distortion due to change in relative pressure that a well-defined light beam passing between the ends is either "on" or "off." The condition of the beam is sensed by the photo-cell which in turn operates pneumatic controls acting through the pneumatic line correspondingly to adjust repeatedly the internal pressure in the envelope so that it continuously spans the ambient pressure, thus providing a measure thereof.

8 Claims, 13 Drawing Figures

Patented Aug. 29, 1972 3,686,958

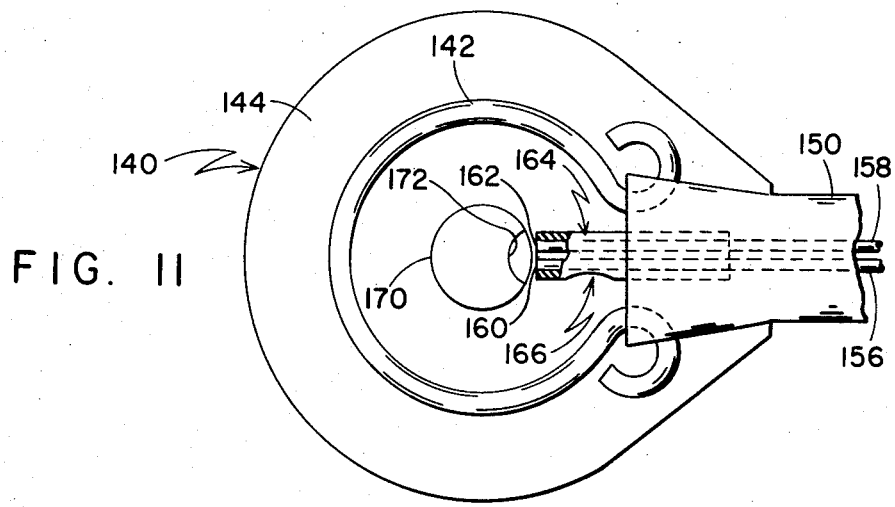
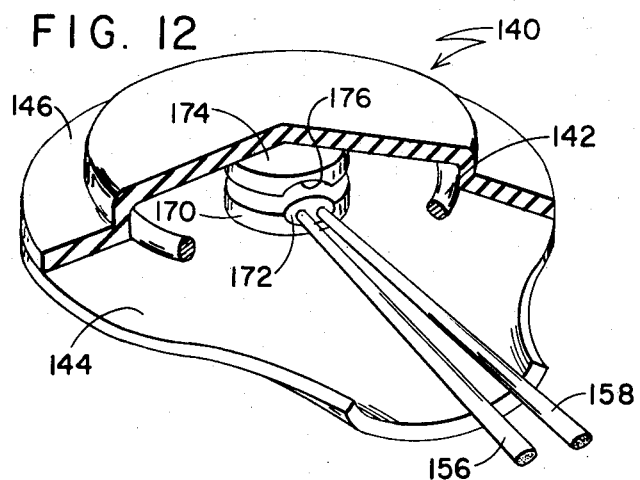
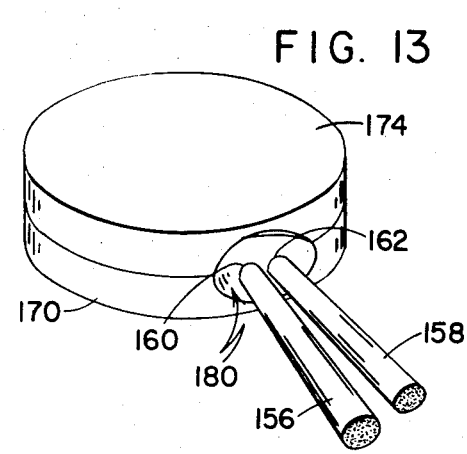
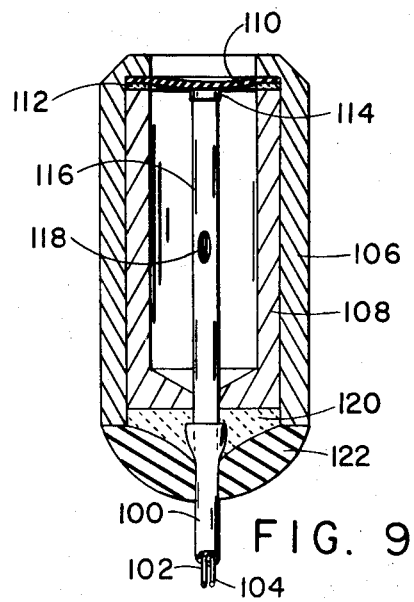
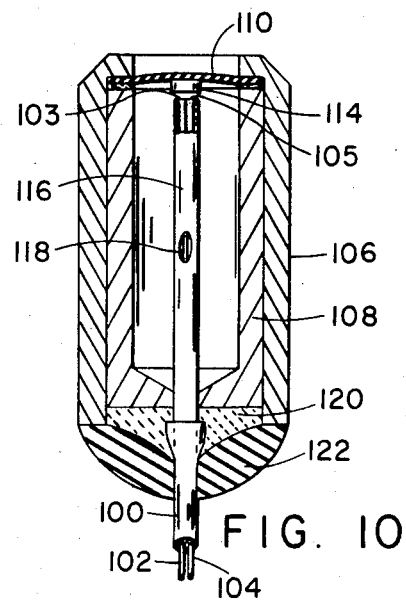

FIBER OPTIC PRESSURE DETECTOR

This invention relates to pressure measuring and monitoring devices. In particular, it relates to devices for continuously and precisely measuring pressure within a confined and relatively inaccessible space, as intracranial pressure of a living human being.

Previous such devices have generally employed electrical conductors and pressure-actuated electric switches. These, however, introduce hazards of electrical shock, particularly when used on the patient simultaneously with other electrically operated apparatus which may carry high voltages. Further, many previous such devices have employed a resilient membrane confining a constant quantity of a gas with resultant changes in gas volume and membrane elasticity with change in temperature, causing false readings of ambient pressure change; a very narrow range of pressures measurable by a single device, requiring the use of several interchangeable devices and involving variable sensitivity over each range and off-scale readings near the limits of a range; and loss of gas pressure due to osmosis through the permeable membrane, causing rapid drift of measurements and eventual uselessness of the device.

Objects of the present invention include the provision of: a device for measuring pressures within confined and relatively inaccessible spaces, such as human intracranial pressure, with an accuracy to within 2.0 mm of water, using fiber optic techniques thereby eliminating any hazard of electrical shock to the patient; a pressure measuring device that is accurate over a wide range of pressures with uniform sensitivity over the entire range; and a device whose operation is not adversely affected by pressure changes due to temperature variation or membrane permeability, and whose measurements are independent of changes in elasticity related to temperature change or other causes.

The invention features a novel sensor unit for use in apparatus for precisely monitoring ambient pressure within a confined space which apparatus includes a light source, a light detector, a source of fluid under pressure, control means for controlling the pressure of said fluid in accordance with light or darkness sensed by the detector and display means for displaying such pressure. The sensor unit comprises an envelope adapted to be placed within the confined space, a pneumatic line in communication with the envelope interior and adapted to be connected to the fluid source, and a pair of light guides each having an internal end terminating within the envelope and, of whose external ends, one faces the light source and the other the light detector. The envelope has at least one wall movable in response to change of relative pressure between the envelope interior and the confined space. Light beam modulating mechanism is mounted within the envelope so as to be relatively movable with respect to the internal guide ends responsive to movements of the movable wall. The internal guide ends and the modulating mechanism are so disposed and arranged that in one position of the mechanism a well defined beam of light will pass between the internal ends of the guides and in another position of the mechanism passage of the beam will be blocked. In this manner the control means, acting through the pneumatic line will adjust the internal pressure in the envelope in accordance with the light condition sensed by the detector to cause the modulating mechanism repeatedly to shift between its two positions, whereby the internal pressure in the envelope continuously spans the ambient pressure providing a measure thereof.

In one embodiment, end faces of the guides within the envelope are opposed, and a shutter is carried on the wall of the envelope portion, and is adapted to be moved thereby between a position obstructing the path of light between the opposed faces and a second position enabling transmission of light. When the pressure within the envelope exceeds the ambient pressure to be measured, the shutter is carried by the envelope wall out of the light path, permitting light to be received by the detector. In response to the transmission of light, the control means decreases the pressure in the fluid source and envelope, causing the shutter to be carried into the position in which it obstructs the light path. When no light is received by the photo-cell, the control means increases the fluid pressure, and this procedure continuously repeats itself. A manometer connected to the fluid source therefore provides a visible indication of the pressure being measured.

In other embodiments, the faces are arranged for light to be reflected from one to the other by the light beam modulating mechanism. In one of these reflective embodiments, a reflective disk is carried on an envelope wall interior surface opposed to the end faces. When the pressure outside the envelope exceeds the interior pressure, the disk is pressed in contact with the end faces and no light is transmitted. When the pressure outside is less than the interior pressure, the disk is carried by the movable wall to a position spaced from and facing the faces, and light is reflected by the disk from one face to the other. The control means decreases the envelope pressure in response to transmission of light, and the process is repeated.

In a second reflective embodiment, a disk is carried on each of two opposed interior surfaces. The two disks are provided with mating cavities having reflecting surfaces such that when the disks are together, the cavities form a single concave reflecting surface. When the ambient pressure is less than the interior envelope pressure, the disks are forced apart, and no light is reflected from one face to the other. When the ambient pressure is less than the interior envelope pressure, the disks are forced together and the two reflecting surfaces cooperate to form a single concave reflecting surface open towards the two end faces, and enabling reflective transmission from one to the other. In this embodiment, the control means increases the envelope pressure in response to transmission of light.

In all forms of the invention the fiber optic light guide elements are preferably carried within the pneumatic line.

In preferred embodiments, especially adapted for the measurement of pressure within the skull of a living human being, the implantable envelope is of medical grade silicone rubber and measures about 3/8 × 7/16 × 5/64 inch. The pneumatic line is a tube of medical grade vinyl tube, of outside diameter of the order of one-sixteenth inch, and the fluid in the reservoir, pneumatic line and envelope is air. The light-conducting lines are carried within the pneumatic line from the implantable envelope to the exterior of the patient's skull for connection to the light source and photo-cell light detector; these light guides are composed of a plurality of flexible light-conducting fibers, bundled together for light transmission, and have a diameter of about 0.005 inch.

Other objects, features, and advantages will appear from the following description of preferred embodiments of the invention, taken together with the accompanying drawings wherein.

Figure 1:
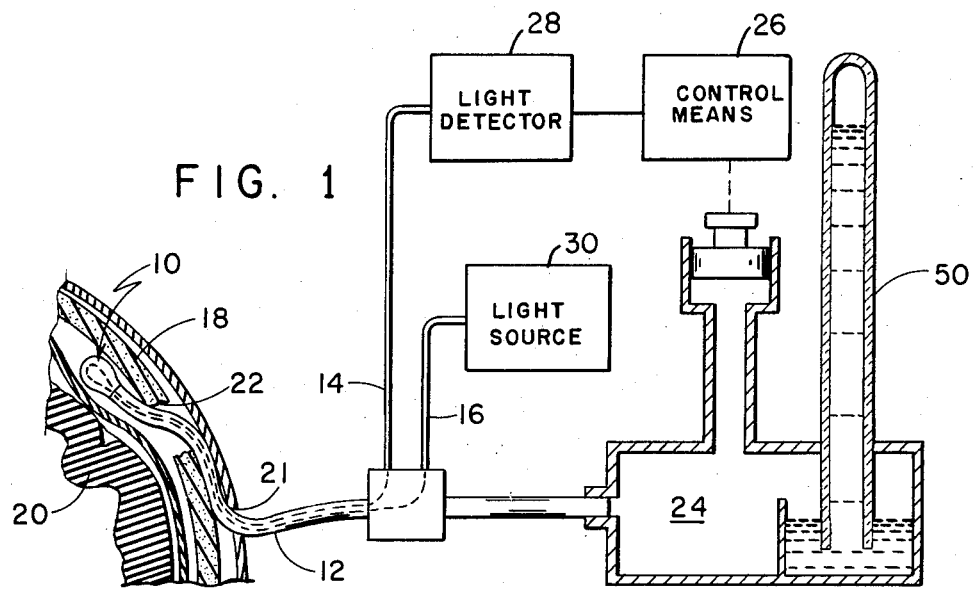
FIG. 1 is a schematic view of apparatus according to the invention shown in use for monitoring intracranial pressure of a living human being.
Figure 2:
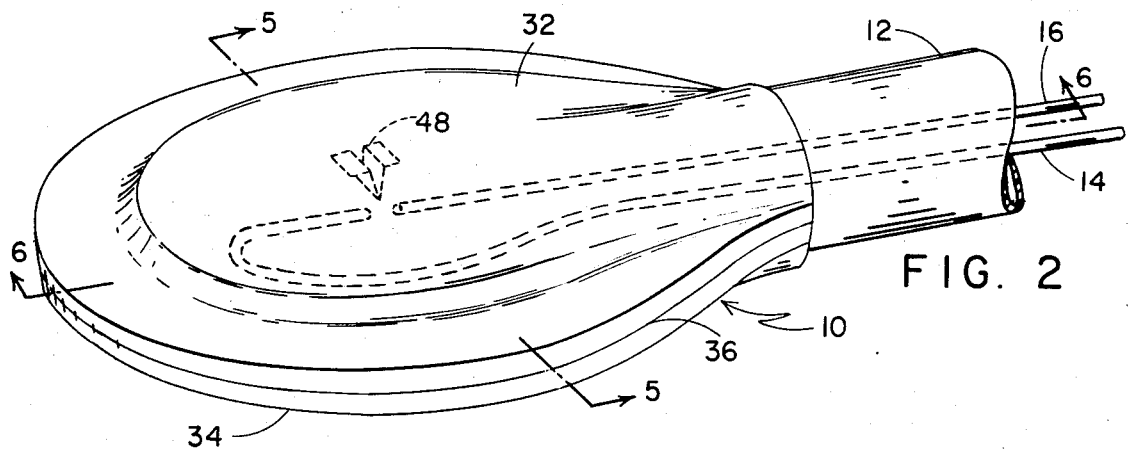
FIG. 2 is a perspective view on a greatly enlarged scale of the implantable envelope portion of the apparatus utilizing a shutter as the light beam modulating means.
Figure 3:
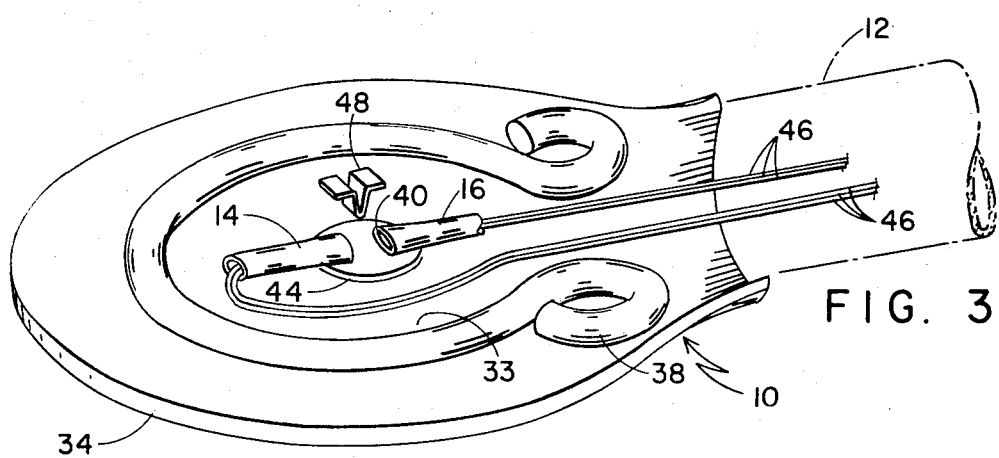
FIG. 3 is similar to FIG. 2 but with a portion of the exterior removed.
Figure 4:
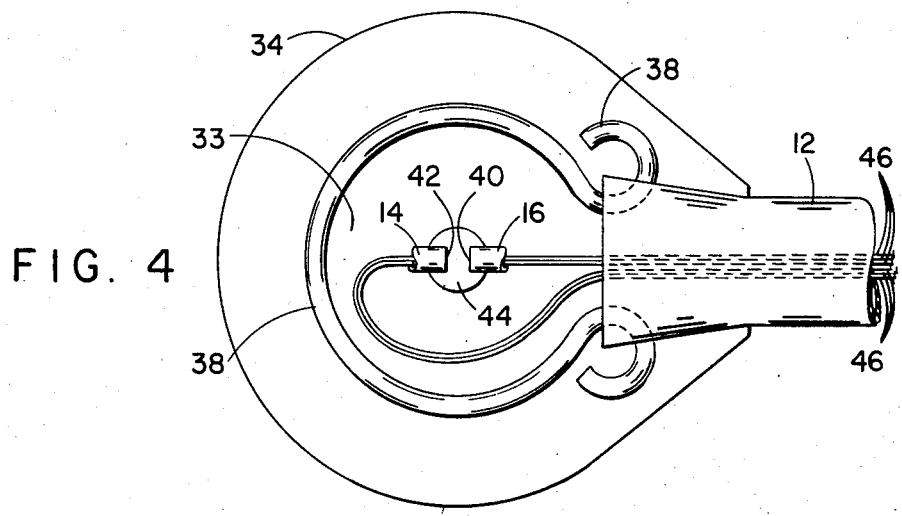
FIG. 4 is a plan view of the implantable portion with the upper portion removed.
Figure 5:
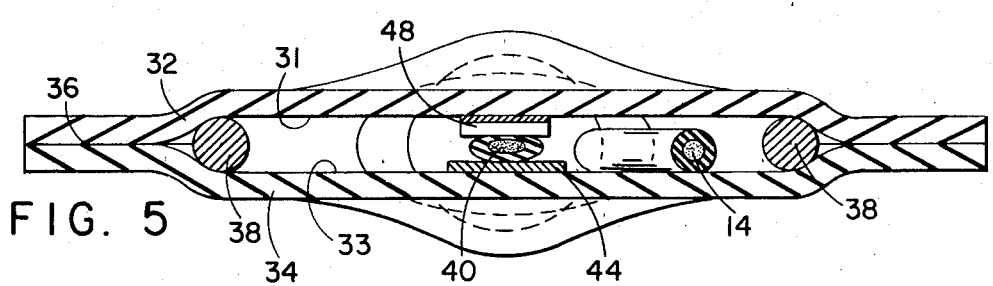
Figure 6:
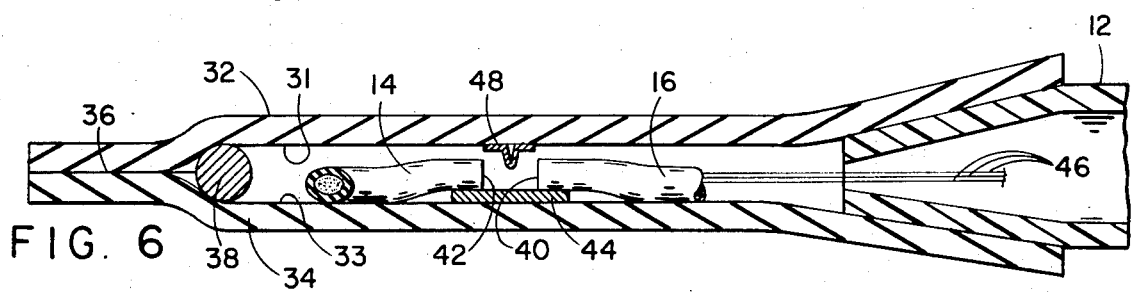
Figure 7:
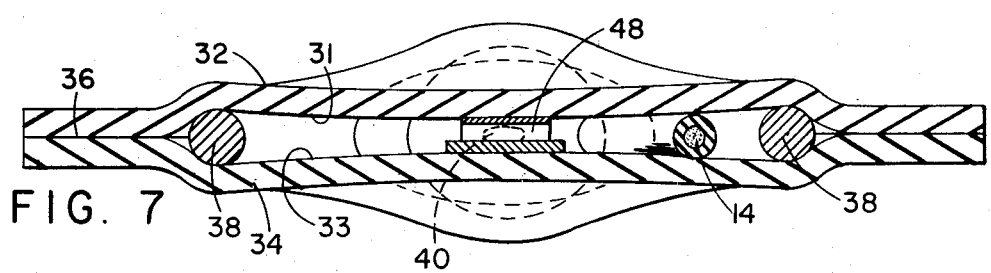
Figure 8:
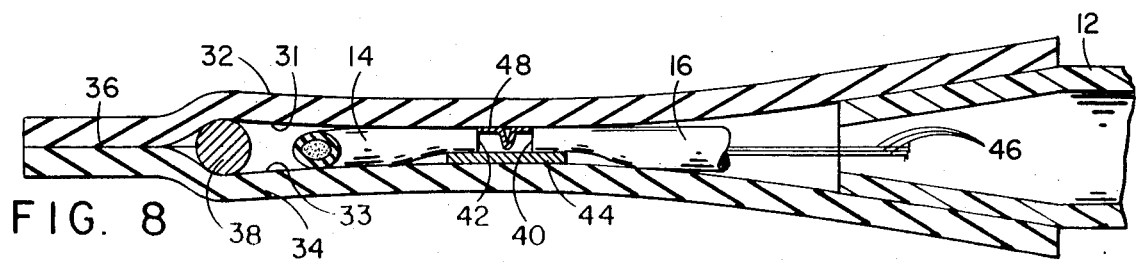

FIGS. 5 and 6 are cross-sectional views taken along the lines 5—5 and 6—6 respectively of FIG. 2;

FIGS. 7 and 8 are views similar to FIGS. 5 and 6 respectively, but show the apparatus at its stage of its operation when light transmission is blocked;

FIGS. 9 and 10 are cross-sections of a portion of one reflective embodiment of the invention; at two stages of its operation; and FIGS. 11, 12, and 13 are a cross-section and two perspective views of a portion of another reflective embodiment.

Referring now to the drawings, and particularly to the embodiment of FIGS. 1–8, an implantable resilient envelope generally designated at 10 is connected to a pneumatic line 12, carrying within it a pair of light conducting lines 14 and 16. Envelope 10 may be made of any suitable material, but medical grade silicone rubber is preferred. For use in monitoring intracranial pressure, suitable dimensions are 3/8 × 7/16 × 5/64 inches. Pneumatic line 12 is preferably of medical grade vinyl with an outside diameter of one-sixteenth inch. Light conducting lines 14 and 16 are preferably fiber optic light guides, each composed of a plurality of thin flexible light-conducting fibers 46, bundled together to form a guide, in a manner well known in the fiber optic art.

Envelope 10 is introduced into the space between the patient's skull 18 and brain 20 through a scalp opening 21 and a burr hole 22. The external end of a pneumatic line 12 is connected to fluid reservoir 24, whose pressure is controlled by control means at 26. In preferred embodiments, this fluid is air. The external ends of light conducting lines 14 and 16 respectively face a light detector in the form of photo-cell 28 and to a light source 30.

Implantable envelope 10 has two generally flat resilient wall portions 32 and 34 providing opposed interior walls 31 and 33 and sealed together throughout most of their circumferences as indicated at 36. Spring 38 maintains the planar form of envelope 10, permitting expansion and contraction of envelope 10 only in the direction transverse to spring 38. Within envelope 10, input guide 16 ends in flat face 40, and output guide 14 ends in opposed face 42. Faces 40 and 42 are maintained in spaced opposed orientation by alignment head 44, carried on wall 34, so that a light beam may pass from one to the other. Interior envelope wall 31 carries a shutter 48, extending perpendicularly towards opposite interior wall 33 and located above the space between opposed faces 40 and 42.

Referring now particularly to FIGS. 5, 6, 7, and 8, when the air pressure inside resilient envelope 10, as controlled by control means 26, exceeds the ambient pressure outside envelope 10, resilient wall portions 32 and 34 are forced apart. Shutter 48 is carried by interior wall 31 from between opposed faces 40 and 42 of the guides. Thus light may be transmitted from light source 30 through input lines 16 to face 40 and thence as a well-defined beam to face 44 of output line 14, and finally to photocell 28.

When the air pressure inside envelope 10 is less than the ambient pressure outside the envelope, on the other hand, resilient wall portions 32 and 34 are forced toward each other, carrying shutter 48 into a position between opposed faces 40 and 42. Shutter 48 thereby obstructs the light beam between these faces, and light cannot be transmitted from light source 30 to photocell 28.

Control means 26 is responsive to photocell 28; when light is detected by the photocell, control means 26 acts to decrease the air pressure in reservoir 24 and thereby within envelope 10. When light is not received by photocell 28, control means 26 responds by increasing the air pressure in reservoir 24 and envelope 10. The operation is repeated continuously and hence the internal envelope pressure continuously spans the ambient pressure outside the envelope and is a measure thereof.

Manometer 50 is connected with reservoir 24, and thus provides a visible indication of the gas pressure in reservoir 24 and in envelope 10 and consequently of the pressure outside the envelope.

In operation, implantable portion 10 of the apparatus is implanted within a patient's skull exterior to the brain. Light source 30 provides light to line 16. Pressure in reservoir 24 is increased until wall portions are forced apart, and light is transmitted from face 40 to face 42 and is received at photocell 28. In response to this light, control means 26 decreases the pressure in reservoir 24 until light transmission is interrupted whereupon the cycle repeats. Manometer 50 constantly displays the air pressure within reservoir 24 and in envelope 10, and thereby indicates the ambient pressure within the patient's brain. The apparatus "tracks" the pressure level within the brain by constantly exceeding or falling below it, and the manometer reading similarly varies rapidly and within narrow limits about the value of the intracranial pressure. Alternatively, this pressure could be recorded on a chart by a pen connected to the fluid reservoir and responsive to the pressure therein.

Referring now to FIGS. 9 and 10, a reflective embodiment of this invention has a vinyl tube 100 carrying two light conductors 102 and 104, as described for the previous embodiments, and connected to light source, detector, and manometer (not shown) as previously described. Conductors 102 and 104 have end faces 103 and 105 respectively. A stainless steel outer case 106 cooperates with an aluminum insert 108 to retain a silicon rubber membrane 110, supporting on its interior surface 112 a polished reflecting disk 114, which may be made, for example, of platinum. Vinyl tube 100 is joined to a stainless steel alignment-air tube 116, providing an air hole 118 through which changes in pressure within the case reach member 110. Tubes 100 and 116 are sealed together by epoxy at 120 and the entire assembly is sealed in medical grade silicone glue at 122. When internal pressure is less than ambient pressure (FIG. 9), membrane 110 carries disk 114 toward and presses it against end faces 103 and 105, preventing light from being reflected from one to the other. When interior pressure is increased (FIG. 10), membrane 110 carries disk 114 away from end faces 103 and 104, and a beam of light is reflected from conductor 104 to conductor 102 by disk 114. When light is detected, a control means (not shown) decreases the pressure in air line 100 and the operation continuously repeats itself.

A second reflective embodiment of this invention (FIGS. 11, 12, and 13) provides an envelope 140 similar to envelope 10 of the non-reflective embodiment, supported by frame 142 and comprising two walls 144 and 146. Vinyl air tube 150 carries two light conductors 156 and 158, with end faces 160 and 162 respectively. The ends of conductors 156 and 158 proximate to end faces 160 and 162 are contained in a support tube 164, to provide accurate alignment. Support tube 164 provides an air hole 166.

Envelope wall 144 carries a disk 170, which provides a concave reflective surface 172. Similarly, wall 146 carries disk 174, with a mating reflective surface 176. When ambient pressure is less than interior envelope pressure (FIG. 12), walls 144 and 146 are forced apart, carrying with them disks 170 and 174. Light from conductor 156 then passes between disks 170 and 174 and is not reflected back to conductor 158. When ambient pressure exceeds interior envelope pressure (FIG. 13), disks 170 and 174 are carried towards each other, and surfaces 172 and 176 together form a single concave reflecting surface 180. Light from end face 160 of conductor 156 is reflected by surface 180 to end face 162 of conductor 158. When light is detected, a control means (not shown) increases the pressure in air line 150, and, again, the process continually repeats itself.

It will be seen that in all forms of the invention the operation of the pressure control means responds to either an "on" or "off" condition of the light beam passing between the ends of the light guides within the envelope, producing very positive action and sensitive tracking of the ambient pressure being monitored. The elimination of all electrical lines to the patient greatly improves the safety factor in use of the equipment for intra-cranial pressure monitoring.

While there are herein disclosed and described presently preferred embodiments of the invention, it will be appreciated that such description is not intended to be limiting.

What is claimed is:

1. For use in apparatus for precisely monitoring ambient pressure within a confined space, said apparatus including a light source, a light detector, a source of fluid under pressure, control means for controlling the pressure of said fluid in accordance with light or darkness sensed by said detector and display means for displaying said pressure, a sensor unit comprising an envelope adapted to be placed within the confined space;

a pneumatic line in communication with the envelope interior and adapted to be connected to said fluid source;

a pair of light guides each having an internal end terminating within the envelope and, of whose external ends, one faces the light source and the other the light detector;

said envelope having at least one wall movable in response to change of relative pressure between the envelope interior and the confined space;

light beam modulating mechanism mounted within said envelope and relatively movable with respect to said internal ends responsive to movements of said movable wall;

said internal ends and said mechanism being so disposed and arranged that in one position of said mechanism a beam of light will pass between said internal ends and, in another position of said mechanism, passage of said beam will be blocked;

so that said control means acting through said pneumatic line will adjust the internal pressure in said envelope in accordance with the light condition sensed by said detector, thereby causing said mechanism repeatedly to shift between its two positions whereby the internal pressure in the envelope continuously spans a range of pressures sufficiently close to said ambient pressure to provide a measure thereof.

2. The combination of claim 1 wherein said light modulating mechanism comprises a shutter interposed between said internal ends and movable between a first position wherein it blocks said beam and a second position wherein it permits passage of said beam.

3. The combination of claim 2 wherein said envelope has opposed walls movable with respect to each other and said shutter is carried by the interior surface of one of said walls.

4. The combination of claim 1 wherein said light modulating mechanism comprises a reflector serving in one position to reflect said beam from one internal end to the other and in another position to prevent such reflection.

5. The combination of claim 4 wherein said interior ends are side by side with their faces facing in the same direction and said reflector is arranged to move between a light blocking position engaging both faces and a light reflecting position spaced from and opposite both faces.

6. The combination of claim 4 where wherein said interior ends are side by side with their faces facing in the same direction and said reflector comprises a pair of disk elements each providing a concave reflecting surface and movable from a mating position with each other wherein said reflecting surfaces cooperate to form a single concave reflector opposite said ends for reflecting light from one to the other, to a separated position wherein said reflecting surfaces are no longer opposite said ends thereby preventing the reflective transmission of light therebetween.

7. The combination of claim 1 wherein said light guides are carried within said pneumatic line from said envelope to a point exterior of said confined space.

8. The combination of claim 7 wherein said light guides are composed of fiber optic elements.

* * * * *